(12) United States Patent
Fukumoto et al.

(10) Patent No.: US 11,721,802 B2
(45) Date of Patent: Aug. 8, 2023

(54) NEGATIVE ELECTRODE FOR NONAQUEOUS ELECTROLYTE SECONDARY BATTERY, AND NONAQUEOUS ELECTROLYTE SECONDARY BATTERY

(71) Applicants: Panasonic Corporation, Kadoma (JP); TOYOTA JIDOSHA KABUSHIKI KAISHA, Toyota (JP)

(72) Inventors: Yusuke Fukumoto, Osaka (JP); Masanori Sugimori, Osaka (JP); Yuji Yokoyama, Hyogo (JP); Nobuhiro Hirano, Osaka (JP); Yo Kato, Nagoya (JP)

(73) Assignees: PANASONIC HOLDINGS CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 17/127,098

(22) Filed: Dec. 18, 2020

(65) Prior Publication Data

US 2021/0202932 A1    Jul. 1, 2021

(30) Foreign Application Priority Data

Dec. 26, 2019   (JP) .................................. 2019-237126

(51) Int. Cl.
| | | |
|---|---|---|
| *H01M 4/36* | (2006.01) | |
| *H01M 10/0525* | (2010.01) | |
| *H01M 4/587* | (2010.01) | |
| *H01M 4/48* | (2010.01) | |
| *H01M 4/38* | (2006.01) | |
| *H01M 4/02* | (2006.01) | |

(52) U.S. Cl.
CPC ........... *H01M 4/364* (2013.01); *H01M 4/386* (2013.01); *H01M 4/483* (2013.01); *H01M 4/587* (2013.01); *H01M 10/0525* (2013.01); *H01M 2004/021* (2013.01); *H01M 2004/027* (2013.01)

(58) Field of Classification Search
None
See application file for complete search history.

(56) References Cited

FOREIGN PATENT DOCUMENTS

| CN | 107946561 A | * | 4/2018 |
| EP | 4037015 A1 | * | 3/2022 |
| WO | 2019/187537 A1 | | 10/2019 |
| WO | WO-2021059705 A1 | * | 4/2021 |

* cited by examiner

*Primary Examiner* — Zhongqing Wei
(74) *Attorney, Agent, or Firm* — WHDA, LLP (57) ABSTRACT

A negative electrode for a nonaqueous electrolyte secondary battery comprises a negative electrode core body and a negative electrode mixture layer provided. When the range of 40% of the thickness of the negative electrode mixture layer from the surface of the negative electrode mixture layer is defined as a first region and the range of 40% of the thickness of the negative electrode mixture layer from the surface of the negative electrode core body is defined as a second region, the BET specific surface area of the graphite included in the first region is smaller than that of the graphite included in the second region. The first region includes the multiwalled fibrous carbon more than the single wall fibrous carbon in terms of mass and the second region includes the single wall fibrous carbon more than the multiwalled fibrous carbon in terms of mass.

5 Claims, 3 Drawing Sheets

NEGATIVE ELECTRODE FOR NONAQUEOUS ELECTROLYTE SECONDARY BATTERY, AND NONAQUEOUS ELECTROLYTE SECONDARY BATTERY

CROSS REFERENCE TO RELATED APPLICATION

The entire disclosure of Japanese Patent Application No. 2019-237126 filed on Dec. 26, 2019 including the specification, claims, drawings, and abstract is incorporated herein by reference in its entirety.

TECHNICAL FIELD

The present disclosure relates to a negative electrode for a nonaqueous electrolyte secondary battery, and to a nonaqueous electrolyte secondary battery using that negative electrode.

BACKGROUND

The negative electrode of a nonaqueous electrolyte secondary battery, such as a lithium ion battery, comprises a negative electrode core body, and a negative electrode mixture layer provided on the surface of the core body. In general, the negative electrode mixture layer includes a negative electrode active material and a binder, and has a uniform layer structure; however, in recent years, negative electrode mixture layers including multiple layers that differ in the type, content, and the like of a negative electrode active material have also been proposed. For example, International Publication No. WO 2019/187537 A discloses a negative electrode comprising a negative electrode mixture layer having a first layer and a second layer formed in sequence from the negative electrode core body side, wherein the first layer includes a first carbon based active material with a 10% proof stress of 3 MPa or less and a silicon based active material containing Si, and the second layer includes a second carbon based active material with a 10% proof stress of 5 MPa or more.

SUMMARY

Technical Problem

Incidentally, due to the change in volume of the negative electrode associated with charging and discharging of the battery, the conductive path is sometimes cut off in a part of the negative electrode mixture layer. In addition, as the conductive path is cut off, the amount of isolated negative electrode active material increases due to the charging and discharging cycle of the battery, leading to a decrease in the battery capacity.

Therefore, an advantage of the present disclosure is to provide a negative electrode for a nonaqueous electrolyte secondary battery that is capable of suppressing a decrease in the capacity during a charging and discharging cycle of the battery, and a nonaqueous electrolyte secondary battery.

Solution to Problem

A negative electrode for a nonaqueous electrolyte secondary battery according to the present disclosure is a negative electrode for a nonaqueous electrolyte secondary battery, comprising a negative electrode core body, and a negative electrode mixture layer provided on the surface of the negative electrode core body, and is characterized in that the negative electrode mixture layer includes graphite, single wall fibrous carbon, and multiwalled fibrous carbon, and that, when the range of 40% of the thickness of the mixture layer from the surface of the negative electrode mixture layer on the side opposite to the negative electrode core body is defined as a first region and the range of 40% of the thickness of the mixture layer from the interface between the negative electrode mixture layer and the negative electrode core body is defined as a second region, the BET specific surface area of the graphite included in the first region is smaller than the BET specific surface area of the graphite included in the second region, and the first region includes the multiwalled fibrous carbon in greater amount than the single wall fibrous carbon in terms of mass and the second region includes the single wall fibrous carbon in greater amount than the multiwalled fibrous carbon in terms of mass.

A nonaqueous electrolyte secondary battery according to the present disclosure comprises the negative electrode described above, a positive electrode, and a nonaqueous electrolyte.

Advantageous Effects of Invention

According to the present disclosure, a decrease in the capacity during a charging and discharging cycle of the battery can be suppressed.

BRIEF DESCRIPTION OF DRAWINGS

Embodiments of the present disclosure will be described based on the following figures, wherein.

DESCRIPTION OF EMBODIMENTS

As a result of intensive studies to solve the problem mentioned above, the present inventors have found that, in the negative electrode mixture layer, by making the BET specific surface area of the graphite included on the surface side smaller than the BET specific surface area of the graphite included on the core body side, placing more multiwalled fibrous carbon on the surface side, and placing more single wall fibrous carbon on the core body side, a decrease in the capacity during the charging and discharging cycle of the battery is suppressed.

In the negative electrode of the present disclosure, the BET specific surface area of the graphite included on the surface side is smaller than the BET specific surface area of the graphite included on the core body side, and therefore, there is a large amount of graphite with a small BET specific surface area on the surface side of the negative electrode mixture layer. In addition, in the negative electrode of the present disclosure, on the surface side of the negative electrode mixture layer, there is a large amount of multiwalled fibrous carbon, which mainly functions as a conductive material. Here, since graphite with a small BET specific surface area has hard particles that are difficult to crush during formation of the negative electrode, gaps are likely to be formed between the graphite particles on the surface side of the negative electrode mixture layer where such graphite is present in a large amount. Therefore, on the surface side of the negative electrode mixture layer, for example, the permeability of the nonaqueous electrolyte is good, which is thought to contribute to the improvement of the output characteristics. On the other hand, as the gaps between the particles increase, formation of the conductive path becomes difficult; however, in the negative electrode of the present disclosure, multiwalled fibrous carbon is disposed on the surface side of the negative electrode mixture layer, thereby ensuring the conductive path. Furthermore, since multiwalled fibrous carbon has a smaller reactivity with a nonaqueous electrolyte than single wall fibrous carbon, disposing a large amount of multiwalled fibrous carbon on the surface side of the negative electrode mixture layer suppresses a decomposition reaction of the nonaqueous electrolyte that occurs on the surface of the negative electrode associated with the charging and discharging cycle. These effects are thought to contribute to the suppression of the decrease in the capacity during the charging and discharging cycle.

Meanwhile, in the negative electrode of the present disclosure, the BET specific surface area of the graphite included on the surface side is smaller than the BET specific surface area of the graphite included on the core body side, and therefore, there is a large amount of graphite with a large BET specific surface area on the core body side of the negative electrode mixture layer. In addition, in the negative electrode of the present disclosure, on the core body side of the negative electrode mixture layer, there is a large amount of single wall fibrous carbon, which mainly functions as a conductive material. Here, graphite with a large BET specific surface area is likely to occlude more lithium ions, and is thought to contribute to a higher battery capacity. On the other hand, the change in volume associated with charging and discharging is large, and there is a concern that the conductive path may be cut off during charging and discharging; however, in the negative electrode of the present disclosure, single wall fibrous carbon is disposed on the core body side of the negative electrode mixture layer, thereby suppressing the cut-off of the conductive path. Furthermore, since single wall fibrous carbon exhibits conductivity that is higher than that of multiwalled fibrous carbon, disposing a large amount of single wall fibrous carbon on the core body side of the negative electrode mixture layer forms a conductive path with a high conductivity. These effects are thought to contribute to the suppression of the decrease in the capacity during the charging and discharging cycle.

Hereinafter, embodiments of the negative electrode of the present disclosure and a nonaqueous electrolyte secondary battery using that negative electrode will be described in detail. The embodiments described below are only examples, and the present disclosure is not limited to the following embodiments. Also, it has been assumed from the outset that multiple embodiments and variations described below can be selectively combined. In the present specification, a reference to "a numerical value (A) to a numerical value (B)" means the numerical value (A) or more and the numerical value (B) or less, unless otherwise stated.

Figure 1:
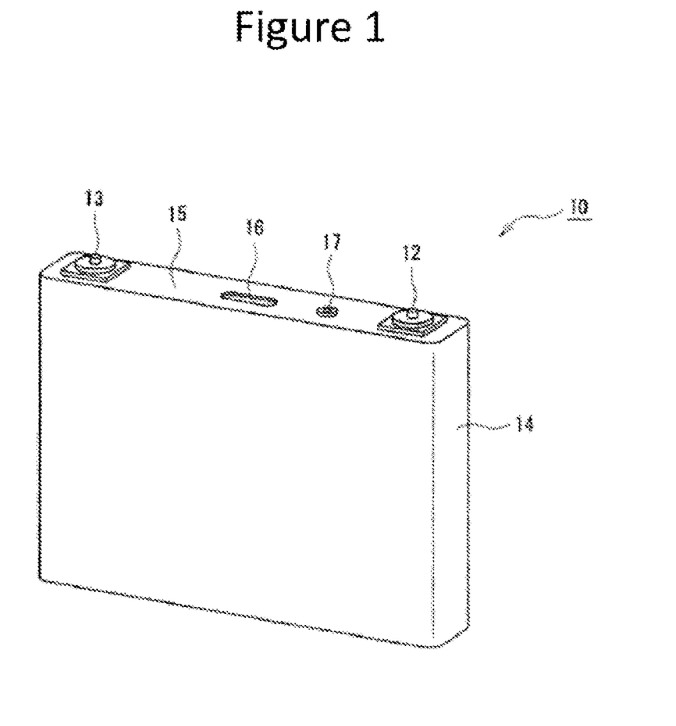
FIG. 1 is a perspective view illustrating the appearance of a nonaqueous electrolyte secondary battery, which is an example of embodiments.
Figure 2:
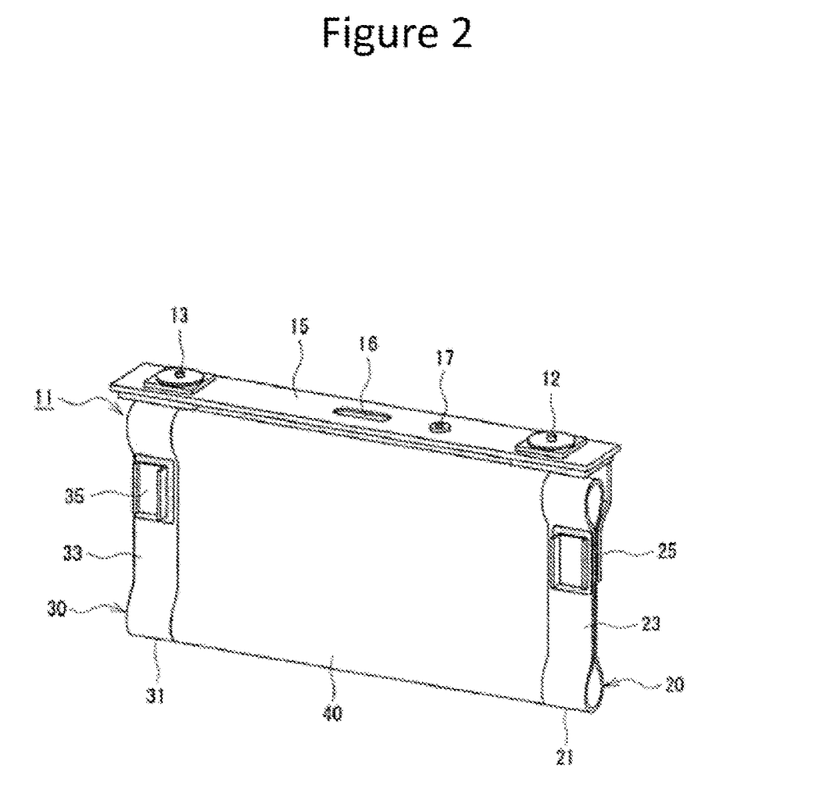
FIG. 2 is a perspective view illustrating an electrode body and sealing plate according to an embodiment and FIG. 3 is a sectional view of a negative electrode according to an embodiment.

FIG. 1 is a perspective view illustrating the appearance of a nonaqueous electrolyte secondary battery 10, which is an example embodiment, and FIG. 2 is a perspective view of an electrode body 11 and a sealing plate 15 constituting the nonaqueous electrolyte secondary battery 10. The nonaqueous electrolyte secondary battery 10 illustrated in FIG. 1 is a rectangular battery comprising a rectangular exterior can 14, but the exterior body of the battery is not limited to the exterior can 14. The exterior body may be, for example, a cylindrical exterior can, or may be an exterior body constituted with a laminated sheet including a metal layer and a resin layer. In addition, although the present embodiment illustrates the electrode body 11 having a winding structure, the electrode body may have a laminated structure in which a plurality of positive electrodes and a plurality of negative electrodes are alternately laminated one by one via a separator.

As illustrated in FIG. 1 and FIG. 2, the nonaqueous electrolyte secondary battery 10 comprises the electrode body 11, a nonaqueous electrolyte, and the exterior can 14 that accommodates them. The exterior can 14 is a flat, bottomed, rectangular tubular metal container with an opening. In addition, the nonaqueous electrolyte second battery 10 has a positive electrode terminal 12 electrically connected to a positive electrode 20 and a negative electrode terminal 13 electrically connected to a negative electrode 30. The positive electrode terminal 12 and the negative electrode terminal 13 are external connection terminals that are electrically connected to another nonaqueous electrolyte secondary battery 10, circuit, equipment, or the like.

The nonaqueous electrolyte includes a nonaqueous solvent, and an electrolyte salt dissolved in the nonaqueous solvent. As the nonaqueous solvent, for example, esters, ethers, nitriles, amides, mixed solvents of two or more of these, and the like are used. The nonaqueous solvent may contain halogen substituted solvents formed by substituting at least a part of the hydrogen atoms in the above solvents with halogen atoms such as fluorine. As the electrolyte salt, for example, lithium salts such as $LiPF_6$ are used. Note that the electrolyte is not limited to a liquid electrolyte and may be a solid electrolyte using a gel polymer or the like.

The electrode body 11 is a winding type electrode body in which the positive electrode 20 and the negative electrode 30 are wound in a spiral shape via a separator 40 and formed into a flat shape. The positive electrode 20, the negative electrode 30, and the separator 40 are all long strip-shaped bodies. The positive electrode 20 has a positive electrode core body 21 and a positive electrode mixture layer (not shown) formed on both sides of the core body, and the negative electrode 30 has a negative electrode core body 31 and a negative electrode mixture layer 32 (see FIG. 3 below) formed on both sides of the core body. The electrode body 11 includes a flat portion and a pair of curved portions. The electrode body 11 is accommodated in the exterior can 14 in a state where the winding axis direction is along the lateral direction of the exterior can 14, and the width direction of the electrode body 11 in which the pair of curved portions are aligned is along the height direction of the nonaqueous electrolyte secondary battery 10.

The nonaqueous electrolyte secondary battery 10 comprises a positive electrode current collector 25 that connects the positive electrode 20 and the positive electrode terminal 12, and a negative electrode current collector 35 that connects the negative electrode 30 and the negative electrode terminal 13. At one end portion in the axial direction of the electrode body 11, a core body laminated portion 23 is formed in which an exposed portion of the positive electrode core body 21 is laminated, and at the other end portion in the axial direction, a core body laminated portion 33 is formed in which an exposed portion of the negative electrode core body 31 is laminated. The positive electrode current collector 25 and the negative electrode current collector 35 are both constituted with two conductive members, and these two members are welded to the core body laminated portion in a state where the core body laminated portion is compressed from both sides in the thickness direction.

The nonaqueous electrolyte secondary battery 10 comprises the sealing plate 15 that seals the opening of the exterior can 14. In the present embodiment, the sealing plate 15 has an elongated rectangular shape, and the positive electrode terminal 12 and the negative electrode terminal 13 are disposed at one end side and at the other end side of the longitudinal direction of the sealing plate 15, respectively. The positive electrode terminal 12 and the negative electrode terminal 13 are both fixed to the sealing plate 15 via an insulating member. The sealing plate 15 is generally provided with a gas discharge valve 16 for discharging gas in the event of a battery malfunction, and a liquid injection portion 17 for injecting the electrolytic solution.

Hereinafter, the positive electrode 20, the negative electrode 30, and the separator 40 constituting the electrode body 11 will be described in detail, with particular reference to the negative electrode 30.

[Positive Electrode]

The positive electrode 20 has the positive electrode core body 21, and the positive electrode mixture layer provided on the surface of the positive electrode core body. As the positive electrode core body 21, a foil of a metal that is stable in the potential range of the positive electrode 20, such as aluminum of an aluminum alloy, a film in which such a metal is placed on the surface layer thereof, or the like can be used. The positive electrode mixture layer includes a positive electrode active material, a conductive material, and a binder, and is preferably provided on both sides of the positive electrode core body 21. The positive electrode 20 can be fabricated by, for example, applying a positive electrode mixture slurry including a positive electrode active material, a conductive material, a binder, and the like on the positive electrode core body 21, drying the coating film, and then compressing it to form a positive electrode mixture layer on both sides of the positive electrode core body 21.

As the positive electrode active material, lithium transition metal composite oxides are used. Examples of the metallic element contained in the lithium transition metal composite oxides include Ni, Co, Mn, Al, B, Mg, Ti, V, Cr, Fe, Cu, Zn, Ga, Sr, Zr, Nb, In, Sn, Ta, W, and the like. Among the above, it is preferable to contain at least one of Ni, Co, and Mn. Suitable examples of the composite oxides include lithium transition metal composite oxides containing Ni, Co, and Mn, and lithium transition metal composite oxides containing Ni, Co, and Al.

As the conductive material included in the positive electrode mixture layer, mention may be made of carbon materials such as carbon black, acetylene black, ketjenblack and graphite. As the binder included in the positive electrode mixture layer, mention may be made of fluororesins such as polytetrafluoromethylene (PTFE) and polyvinylidene fluoride (PVdF) polyacrylonitrile (PAN), polyimide resins, acrylic resins, polyolefin resins, and the like. Also, these resins may be used in combination with cellulose derivatives such as carboxymethyl cellulose (CMC) or salts thereof, polyethylene oxide (PEO), or the like.

[Negative Electrode]

Figure 3:
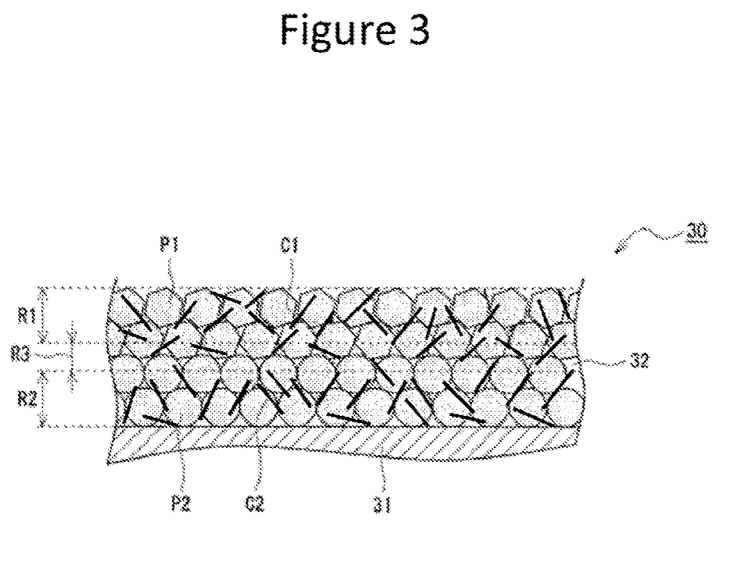

FIG. 3 is a sectional view illustrating a part of the negative electrode 30. As illustrated in FIG. 3, the negative electrode 30 has the negative electrode core body 31, and the negative electrode mixture layer 32 provided on the surface of the negative electrode core body 31. As the negative electrode core body 31, a foil of a metal that is stable in the potential range of the negative electrode 30, such as copper, a film in which such a metal is placed on the surface layer thereof, or the like can be used. The negative electrode mixture layer 32 includes graphite and fibrous carbon including single wall fibrous carbon and multiwalled fibrous carbon. The fibrous carbon mainly functions as a conductive material that forms a conductive path in the negative electrode mixture layer 32. In addition, preferably, the negative electrode mixture layer 32 further includes a binder and is provided on both sides of the negative electrode core body 31.

The graphite included in the negative electrode mixture layer 32 functions as a negative electrode active material that reversibly occludes and releases lithium ions. As the graphite, natural graphites such as flaky graphite, massive graphite, and earthy graphite, as well as artificial graphites such as massive artificial graphite (MAG) and graphitized mesophase carbon microbeads (MCMB) are used. In addition, the negative electrode mixture layer 32 may include, in addition to the graphite, which is a carbon-based active material, an Si based active material containing Si. By using a carbon-based active material and an Si based active material in combination, a higher capacity can be achieved.

As the binder included in the negative electrode mixture layer 32, as in the case of the positive electrode 20, fluororesins, PAN, polyimides, acrylic resins, polyolefins, and the like can be used, but use of a styrene-butadiene rubber (SBR) is preferable. In addition, preferably, the negative electrode mixture layer 32 further includes CMC or salts thereof, polyacrylic acid (PAA) or salts thereof, polyvinyl alcohol (PVA), and the like. Among the above, it is suitable to use SBR in combination with CMC or salts thereof or with PAA or salts thereof.

The negative electrode mixture layer 32 is characterized by that, along the thickness direction, when the range of 40% of the thickness of the mixture layer from the surface of the negative electrode mixture layer 32 is defined as a region R1 (first region) and the range of 40% of the thickness of the mixture layer from the interface between the negative electrode mixture layer 32 and the negative, electrode core body 31 is defined as a region R2 (second region), the regions differ from each other in their constituents. Specifically, the BET specific surface area of the graphite included in the region R1 is smaller than the BET specific surface area of the graphite included in the region R2. In addition, the region R1 includes the multiwalled fibrous carbon in greater quantity than the single wall fibrous carbon in terms of mass and the region R2 includes the single wall fibrous carbon in greater quantity than the multiwalled fibrous carbon in terms of mass. That is, the negative electrode mixture layer 32 includes at least two kinds of graphites and at least two kinds of fibrous carbons.

The content of graphite is, when only graphite is used as the negative electrode active material, preferably 80 to 98% by mass, more preferably 85 to 97% by mass, and particularly preferably 90 to 96% by mass relative to the mass of the negative electrode mixture layer 32. When the content of graphite is within such a range, a battery with a high capacity can be obtained. In the regions R1 and R2, the content ratio of graphite is, for example, substantially the same.

The content of fibrous carbon is preferably 0.01 to 5% by mass, more preferably 0.02 to 4% by mass, and particularly preferably 0.04 to 3% by mass relative to the mass of the negative electrode mixture layer 32. When the content of fibrous carbon is within such a range, a good conductive path can be formed in the negative electrode mixture layer 32. In the regions R1 and R2, the content ratio of fibrous carbon is, for example, substantially the same.

In the example illustrated in FIG. 3, graphite P1 and multiwalled fibrous carbon C1 are present in the region R1 and graphite P2 and single wall fibrous carbon C2 are present in the region R2. Here, graphite P1 is a material with a BET specific surface area that is smaller than that of graphite P2. Note that, in the negative electrode mixture layer 32, as long as the condition that the BET specific surface area of the graphite included in the region R1 is smaller than the BET specific surface area of the graphite included in the region R2 is met, graphite P2 may be included in the region R1 and graphite P1 may be included in the region R2. In addition, as long as the condition that the region R1 includes the multiwalled fibrous carbon in greater quantity than the single wall fibrous carbon in terms of mass and the region R2 includes the single wall fibrous carbon in greater quantity than the multiwalled fibrous carbon in terms of mass, single wall fibrous carbon C2 may be included in the region R1 and multiwalled fibrous carbon C1 may be included in the region R2. Also, to the extent that the advantage of the present disclosure is not impaired, the negative electrode mixture layer 32 may include three or more kinds of graphites and fibrous carbons, and may include, for example, a particulate conductive material such as carbon black.

A region R3 sandwiched between the regions R1 and R2, which is located in the center of the thickness direction of the negative electrode mixture layer 32, may have the same configuration as the region R1, or may have the same configuration as the region R2. Also, the boundary between the regions R1 and R2 may be present within the region R3. Alternatively, the physical properties of the graphite and the amount of the fibrous carbon included in the region R3 may be gradually changed along the thickness direction of the negative electrode mixture layer 32 such that as it gets closer to the region R1, the BET specific surface area of the graphite becomes smaller and there is more multiwalled fibrous carbon C1 and less single wall fibrous carbon C2.

The thickness of the negative electrode mixture layer 32 on one side of the negative electrode core body 31 is, for example, 40 µm to 120 µm, and is preferably 50 µm to 90 µm. The thickness of the negative electrode mixture layer 32 is measured from a sectional image of the negative electrode 30 acquired by a scanning electron microscope (SEM). Similarly, the regions R1 and R2 are also determined from that SEM image. In general, the thickness of the negative electrode mixture layer 32 is approximately constant, but if there is variation in thickness, for example, in the area with a large thickness, the ranges of the regions R1 and R2 also become larger, and in the area with a small thickness, the ranges of the regions R1 and R2 also become smaller.

The BET specific surface area of the graphite included in the region R1 is preferably 0.5 m$^2$/g or more and less than 2 m$^2$/g, more preferably 0.75 m$^2$/g or more and 1.9 m$^2$/g less, and particularly preferably 1.0 m$^2$/g or more and 1.8 m$^2$/g or less. When the BET specific surface area of the graphite included in the region R1 is within such a range, the permeability of the nonaqueous electrolyte becomes good on the surface side of the negative electrode mixture layer 32, and the output characteristics may be improved. The BET specific surface area of graphite is measured according to the BET method, using a conventionally and publicly frown specific surface area measuring apparatus (for example, Macsorb (registered trademark) HM model-1201, manufactured by Mountech Co., Ltd.).

The BET specific surface area of the graphite included in the region R2 is preferably 2 m$^2$/g or more and 5 m$^2$/g or less, more preferably 2.5 m$^2$/g or more and 4.5 m$^2$/g or less, and particularly preferably 3.0 m$^2$/g or more and 4.0 m$^2$/g or less. When the BET specific surface area of the graphite included in the region R2 is within such a range, more lithium ions are likely to be occluded, which may contribute to a higher battery capacity.

In the negative electrode mixture layer 32, since, for example, in terms of mass, there is more graphite P1 than graphite P2 in the region R1 and there is more graphite P2 than graphite P1 in the region R2, the BET specific surface area of the graphite included in the region R1 is smaller than the BET specific surface area of the graphite included in the region R2. As the negative electrode active material, the region R1 may include substantially only graphite P1 and the region R2 may include substantially only graphite P2.

The median diameter on a volume basis of graphite P1 and P2 (hereinafter, referred to as "D50") is, for example, 5 µm to 30 µm, and is preferably 10 µm to 25 µm. The D50 of graphite P1 and P2 may be different from each other, or may be substantially the same. D50 means the particle diameter at which the cumulative frequency reaches 50% from the smallest particle diameter in the particle size distribution on a volume basis, also blown as the median diameter. The particle size distribution of graphite particles can be measured by using a laser diffraction type particle size distribution measuring apparatus (for example, MT3000II, manufactured by MicrotracBEL Corp.) and water as the dispersion media.

Graphite P1 preferably comprises hard particles with a 10% proof stress of, for example, 5 MPa or more. The 10% proof stress means the pressure at which a graphite particle is compressed by 10% by volume ratio. The 10% proof stress can be measured for a single particle of graphite, using a micro-compression tester (MCT-211, manufactured by Shimadzu Corporation), or the like. In such a measurement, a particle with a particle diameter that is equivalent to D50 is used. Graphite P2 preferably comprises, for example, particles that are softer than graphite P1, and has a 10% proof stress of 3 MPa or less. In the negative electrode mixture layer 32, the average value of the 10% proof stress of the graphite in the region R1 is preferably greater than the average value of the 10% proof stress of the graphite in the region R2.

Graphite P1 and P2 are fabricated by, for example, crushing coke (precursor), which is the main raw material, into a predetermined size, adding a binder to the crushed material to aggregate it, then calcining it at a high temperature of 2500° C. or more to graphitize it, and then sieving it. As the binder, it is preferable to use pitch. A part of the pitch is volatilized during the calcination step, and a part of the rest remains to be graphitized. The BET specific surface area of graphite can be adjusted according to, for example, the particle diameter of the precursor after crushing, the particle diameter of the precursor in its aggregated state, the amount of pitch to be added, the calcination temperature, and the like.

Multiwalled fibrous carbon C1 included in the negative electrode mixture layer 32 is a carbon nanostructure in which a plurality of layers of graphite carbon hexagonal network planes are laminated concentrically to constitute a single cylindrical shape, which is so-called a multiwalled carbon nanotube (hereinafter, may be referred to as a MWCNT). The BET specific surface area of multiwalled fibrous carbon C1 is preferably 10 m$^2$/g to 450 m$^2$/g or less, and is more preferably 100 m$^2$/g to 350 m$^2$/g or less. When the BET specific surface area of multiwalled fibrous carbon C1 satisfies the range described above, the reactivity with the nonaqueous electrolyte is suppressed, which may contribute to the suppression of decrease in the charging and discharging cycle characteristics.

Single wall fibrous carbon C2 included in the negative electrode mixture layer 32 is a carbon nanostructure in which a single layer of graphite carbon hexagonal network plane constitutes a single cylindrical shape, which is so-called a single wall carbon nanotube (hereinafter, may be referred to as a SWCNT). The BET specific surface area of single wall fibrous carbon C2 is preferably, for example, 500 m$^2$/g or more, and is more preferably 800 m$^2$/g or more. When the BET specific surface area of single wall fibrous carbon C2 satisfies the range described above, the conductivity of the negative electrode mixture layer 32 is improved, which may contribute to the improvement of the output characteristics of the battery.

The negative electrode mixture layer 32 may include fibrous carbon other than multiwalled fibrous carbon C1 and single wall fibrous carbon C2, and examples thereof include, for example, carbon nanofibers (CNFs), vapor gown carbon fibers (VGCFs), electrospun carbon fibers, polyacrylonitrile (PAN) based carbon fibers, pitch based carbon fibers, and the like.

The content of multiwalled fibrous carbon C1 included in the region R1 is preferably 60% by mass or more, preferably 90% by mass or more, and more preferably 100% by mass, relative to the total amount of fibrous carbon included in the region R1, from the viewpoint of, for example, suppressing a decrease in the capacity during the charging and discharging cycle of the battery.

The content of single wall fibrous carbon C2 included in the region R2 is preferably 60% by mass or more, preferably 90% by mass or more, and more preferably 100% by mass, relative to the total amount of fibrous carbon included in the region R2, from the viewpoint of, for example, suppressing a decrease in the capacity during the charging and discharging cycle of the battery.

As described above, the negative electrode mixture layer 32 may include an Si based active material. The Si based active material may be Si, but it is preferably an Si containing compound containing a silicon oxide phase and Si particles dispersed in that silicon oxide phase (hereinafter, referred to as "SiO"), or a Si containing compound containing a lithium silicate phase and Si particles dispersed in that lithium silicate phase (hereinafter, referred to as "LSX"). SiO and LSX may be used in combination. The content of the Si based active material is preferably 1 to 20% by mass, more preferably 2 to 15% by mass, and particularly preferably 3 to 10% by mass relative to the mass of the negative electrode active material.

The Si based active material is, for example, uniformly included throughout the negative electrode mixture layer 32. Alternatively, the Si based active material may be included only in the region R1, or may be included only in the region R2. It may also be included in both regions R1 and R2, and may be included in greater quantity in the region R1 or may be included in greater quantity in the region R2, in terms of mass.

SiO and LSX comprise, for example, particles having a D50 that is smaller than the D50 of the graphite particles. The D50 of SiO and LSX is preferably 1 μm to 15 μm, and is more preferably 4 μm to 10 μm. On the surface of the SiO and LSX particles, a conductive layer constituted with a material having a high conductivity may be formed. Suitable examples of the conductive layer include carbon coatings. The thickness of the conductive layer is preferably 1 nm to 200 nm, and is more preferably 5 nm to 100 nm, in consideration of ensuring the conductivity and the diffusibility of lithium ions into the particles.

SiO comprises, for example, particles in which fine Si particles are dispersed in the silicon oxide phase. Suitable SiO has a sea island structure in which fine Si particles are approximately uniformly dispersed in a matrix of amorphous silicon oxide, and is represented by the general formula $SiO_x$ ($0.5 \leq x \leq 1.0$). The content ratio of Si particles, is preferably 35 to 75% by mass relative to the total mass of SiO from the viewpoint of achieving for example, both battery capacity and cycle characteristics, or the like. For example, when the content ratio of Si particles is too low, the charging and discharging capacity is reduced, and when the content ratio of Si particles is too high, a part of the exposed Si particle, which are not covered by silicon oxide, come into contact with the electrolyte, and the cycle characteristics may be reduced.

The average particle diameter of the Si particles dispersed in the silicon oxide phase is generally 500 nm or less before charging and discharging, is preferably 200 nm or less, and is more preferably 50 nm or less. After charging and discharging, it is preferably 400 nm or less and is more preferably 100 nm or less. By making the Si particles finer, the volume change during charging and discharging becomes smaller and the cycle characteristics may be improved. The average particle diameter of the Si particles is measured by observing the section of SiO using a scanning electron microscope (SEM) or a transmission electron microscope (TEM), specifically as the average value of the longest diameters of 100 Si particles. The silicon oxide phase is constituted with, for example, a group of particles that are finer than the Si particles.

LSX comprises, for example, particles in which fine Si particles are dispersed in the lithium silicate phase. Suitable LSX has a sea island structure in which fine Si particles are approximately uniformly dispersed in a matrix of lithium silicate represented by the general formula $Li_{2z}SiO_{(2+z)}$ ($0<z<2$). The content ratio of Si particles is preferably 35 to 75% by mass relative to the total mass of LSX, as in the case of SiO. Also, the average particle diameter of the Si particles is generally 500 μm or less before charging and discharging, is preferably 200 nm or less, and is more preferably 50 nm or less. The lithium silicate phase is constituted with, for example, a group of particles that are finer than the Si particles.

The lithium silicate phase is preferably constituted with a compound represented by $Li_{2z}SiO_{(2+z)}$ ($0<z<2$). That is, the lithium silicate phase does not include $Li_4SiO_4$ ($Z=2$). $Li_4SiO_4$ is an unstable compound and reads with water to exhibit alkalinity, which may alter Si and reduce the charging and discharging capacity. The lithium silicate phase is suitably made up mainly of $Li_2SiO_3$($Z=1$) or $Li_2Si_2O_5$ ($Z=1/2$) from the viewpoint of stability, ease of fabrication, lithium ion conductivity, and the like. When $Li_2SiO_3$ or $Li_2Si_2O_5$ is the main component, the content of such a main component is preferably in excess of 50% by mass of the total mass of the lithium silicate phase, and is more preferably 80% by mass or more.

SiO can be fabricated by the following steps 1 to 3.

(1) Si and silicon oxide are mixed at a weight ratio of, for example, 20:80 to 95:5 to fabricate an admixture.

(2) Before the fabrication of or after the fabrication of the admixture described above, Si and silicon oxide are crushed into fine particles using a ball mill or the like.

(3) The crushed admixture is subjected to a heat treatment at, for example, 600 to 1000° C. in an inert atmosphere.

Note that LSX can be fabricated by using lithium silicate instead of silicon oxide in the steps described above.

The negative electrode 30 is fabricated by using, for example, a first negative electrode mixture slurry including graphite P1 multiwalled fibrous carbon C1, and a hinder, and a second negative electrode mixture slurry including graphite P2, single wall fibrous carbon C2, and a binder. At first, the second negative electrode mixture slurry is applied to the surface of the negative electrode core body 31 and the coating film is dried. Then, the first negative electrode mixture slurry is applied onto the coating film formed by the second negative electrode mixture slurry, and the coating film is dried and compressed, thereby obtaining a negative electrode 30 in which the negative electrode mixture layer 32 having the layer structure described above is formed on both sides of the negative electrode core body 31. In the above method, the negative electrode mixture slurry for the surface side is applied after the negative electrode mixture slurry for the core body side is applied and then dried, but another method may be employed in which the negative electrode mixture slurry for the surface side is applied after the negative electrode mixture slurry for the core body side is applied and before it has been dried. When the latter method is used, a mixture layer in which, the negative electrode mixture slurry for the core body side and the negative electrode mixture slurry for the surface side are mixed together is likely to be formed.

[Separator]

As the separator 40, a porous sheet having ion permeability and insulation properties is used. Specific examples of the porous sheet include microporous thin films, woven fabrics, nonwoven fabrics, and the like. As the material of the separator 40, polyolefins such as polyethylene and polypropylene, cellulose, and the like are suitable. The separator 40 may be either a single layer structure or a laminated structure. On the surface of the separator 40, a heat resistant layer or the like may be formed.

EXAMPLES

Hereinafter, the present disclosure will be further described with reference to Examples, but the present disclosure is not limited to these Examples.

Example 1

[Fabrication of Positive Electrode]

As the positive electrode active material, a lithium transition metal composite oxide represented by the general formula $LiNi_{0.82}Co_{0.15}Al_{0.03}O_2$ was used. By mixing the positive electrode active material, acetylene black, and polyvinylidene fluoride at a solid mass ratio of 97:2:1 and by using N-methyl-2-pyrrolidone (NMP) as the dispersion medium a positive electrode mixture slurry was prepared. Next, this positive electrode mixture slurry was applied to both sides of the positive electrode core body composed of aluminum foil, the coating film was dried and compressed, and then cut into a predetermined electrode size, thereby obtaining a positive electrode in which the positive electrode mixture layer was formed on both sides of the positive electrode core body.

[Preparation of First Negative Electrode Mixture Slurry]

By mixing an admixture in which multiwalled fibrous carbon (MWCNT) and single wall fibrous carbon (SWCNT) that had been mixed at a mass ratio of 60:40 with sodium carboxymethyl cellulose (CMC-Na) at a solid mass ratio of 1:1 and by using water as the dispersion medium, a conductive paste was prepared. By mixing graphite A (negative electrode active material) with a BET specific surface area of 1.5 $m^2/g$, the conductive paste, a dispersion of a styrene-butadiene rubber (SBR), and sodium carboxymethyl cellulose (CMC-Na) at a solid mass ratio of 100:1:1:1 and by using water as the dispersion medium, a first negative electrode mixture slurry was prepared. The solid mass ratio of graphite A, the carbon nanotubes, the styrene-butadiene rubber (SBR), and sodium carboxymethyl cellulose (CMC-Na) was 100:0.5:1:1.5.

[Preparation of Second Negative Electrode Mixture Slurry]

By mixing an admixture in which multiwalled fibrous carbon (MWCNT) and single wall fibrous carbon (SWCNT) that had been mixed at a mass ratio of 40:60 with sodium carboxymethyl cellulose (CMC-Na) at a solid mass ratio of 1:1 and by using water as the dispersion medium, a conductive paste was prepared. By mixing graphite B (negative electrode active material) with a BET specific surface area of 2.5 $m^2/g$, the conductive paste, a dispersion of SBR, and CMC-Na at a solid mass ratio of 100:1:1:1 and by using water as the dispersion medium, a second negative electrode mixture slurry was prepared. The solid mass ratio of graphite B, the multiwalled fibrous carbon, the styrene-butadiene rubber (SBR), and sodium carboxymethyl cellulose (CMC-Na) was 100:0.5:1:1.5.

[Fabrication of Negative Electrode]

The second negative electrode mixture slurry was applied to both sides of the negative electrode core body composed of copper foil, the coating film was dried, the first negative electrode mixture slurry was then applied onto that coating film, the coating film was dried and compressed, thereby forming a negative electrode mixture layer on both sides of the negative electrode core body. The negative electrode core body having a negative electrode mixture layer formed thereon was cut into a predetermined electrode size, thereby obtaining a negative electrode. The amounts of the first and second negative electrode mixture slurries applied were the same, and the negative electrode mixture layer with a thickness of 160 μm (excluding the core body) was formed. In the negative electrode mixture layer, the content of the MWCNT and the content of the SWCNT in the region R1 were 60% by mass and 40% by mass relative to the entire amount of fibrous carbon in the region R1 respectively. Also, the content of the MWCNT and the content of the SWCNT in the region R2 were 40% by mass and 60% by mass relative to the entire amount of fibrous carbon in the region R2, respectively.

[Preparation of Nonaqueous Electrolytic Solution]

Ethylene carbonate (EC), methyl ethyl carbonate (EMC), and dimethyl carbonate (DMC) were mixed at a volume ratio of 3:3:4. In that mixed solvent, $LiPF_6$ was dissolved to a concentration of 1.0 mol/L, thereby preparing a nonaqueous electrolytic solution.

[Fabrication of Nonaqueous Electrolyte Secondary Battery]

The above positive electrode and the above negative electrode were wound in a spiral shape via a separator made of polyethylene and formed into a flat shape, thereby fabricating a winding type electrode body. In addition, a positive electrode lead made of aluminum and a negative electrode lead made of nickel were welded to an exposed portion of the positive electrode core body and to an exposed portion of the negative electrode core body, respectively. By accommodating this electrode body in an exterior body constituted with an aluminum laminate, injecting the above nonaqueous electrolytic solution, and then sealing the opening of the exterior body, a nonaqueous electrolyte secondary battery was fabricated.

Example 2

A negative electrode and a nonaqueous electrolyte secondary battery were fabricated in the same manner as in Example 1 except that a conductive paste prepared by mixing the multiwalled fibrous carbon (MWCNT) with sodium carboxymethyl cellulose (CMC-Na) at a solid mass ratio of 1:1 and by using water as the dispersion medium was used in the preparation of the first negative electrode mixture slurry and that a conductive paste prepared by mixing the single wall fibrous carbon (SWCNT) with sodium carboxymethyl cellulose (CMC-Na) at a solid mass ratio of 1:1 and by using water as the dispersion medium was used in the preparation of the second negative electrode mixture slurry. In the negative electrode mixture layer of Example 2, the content of the MWCNT in the region R1 was 100% by mass relative, to the entire amount of fibrous carbon in the region R1. Also, the content of the SWCNT in the region R2 was 100% by mass relative to the entire amount of fibrous carbon in the region R2.

Example 3

In the preparation of the first negative electrode mixture slurry, an admixture in which the multiwalled fibrous carbon (MWCNT) and the single wall fibrous carbon (SWCNT) had been mixed at a mass ratio of 75:25 was used, and also, an admixture of graphite A and a Si containing compound (SiO) represented by $SiO_x$ (X=0.94) at a solid mass ratio of 90:10 was used as the negative electrode active material. Moreover, in the preparation of the second negative electrode mixture slurry an admixture in which the multiwalled fibrous carbon (MWCNT) and the single wall fibrous carbon (SWCNT) had been mixed at a mass ratio of 25:75 was used, and also, an admixture of graphite B and SiO at a solid mass ratio of 90:10 was used as the negative electrode active material. Then, a negative electrode and a nonaqueous electrolyte secondary battery were fabricated in the same manner as in Example 1 except the above and that the negative electrode mixture layer with a total thickness of 152 μm (excluding the core body) on both sides was formed. Note that the amount and thickness of the mixture to be applied were regulated such that the capacity became similar to that of the nonaqueous electrolyte secondary battery of Example 1. In the negative electrode mixture layer of Example 3, the content of the MWCNT and the content of the SWCNT in the region R1 were 75% by mass and 25% by mass relative to the entire amount of fibrous carbon in the region R1, respectively. Also, the content of the MWCNT and the content of the SWCNT in the region R2 were 25% by mass and 75% by mass relative to the entire amount of fibrous carbon in the region R2, respectively.

Comparative Example 1

A negative electrode and a nonaqueous electrolyte secondary battery were fabricated in the same manner as in Example 1 except that an admixture in which the multiwalled fibrous carbon (MWCNT) and the single wall fibrous carbon (SWCNT) had been mixed at a mass ratio of 40:60 was used in the preparation of the first negative electrode mixture slurry and that an admixture in which the multiwalled fibrous carbon (MWCNT) and the single wall fibrous carbon (SWCNT) had been mixed at a mass ratio of 60:40 was used in the preparation of the second negative electrode mixture slurry. In the negative electrode mixture layer of Comparative Example 1, the content of the MWCNT and the content of the SWCNT in the region R1 was 40% by mass and 60% by mass relative to the entire amount of fibrous carbon in the region R1, respectively. Also, the content of the MWCNT and the content of the SWCNT in the region R2 was 60% by mass and 40% by mass relative to the entire amount of fibrous carbon in the region R2, respectively.

Comparative Example 2

A negative electrode and a nonaqueous electrolyte secondary battery were fabricated in the same manner as in Example 1 except that an admixture in which the multiwalled fibrous carbon (MWCNT) and the single wall fibrous carbon (SWCNT) had been mixed at a mass ratio of 40:60 was used in the preparation of the first negative electrode mixture slurry and that an admixture in which the multiwalled fibrous carbon (MWCNT) and the single wall fibrous carbon (SWCNT) had been mixed at a mass ratio of 50:50 was used in the preparation of the second negative electrode mixture slurry. In the negative electrode mixture layer of Comparative Example 2, the content of the MWCNT and the content of the SWCNT in the region R1 were 40% by mass and 60% by mass relative to the entire amount of fibrous carbon in the region R1, respectively. Also, the content of the MWCNT and the content of the SWCNT in the region R2 were 50% by mass and 50% by mass relative to the entire amount of fibrous carbon in the region R2, respectively.

Comparative Example 3

A negative electrode and a nonaqueous electrolyte secondary battery were fabricated in the same manner as in Example 1 except that an admixture in which the multiwalled fibrous carbon (MWCNT) and the single wall fibrous carbon (SWCNT) had been mixed at a mass ratio of: 50:50 was used in the preparation of the first negative electrode mixture slurry and that an admixture in which the multiwalled fibrous carbon (MWCNT) and the single wall fibrous carbon (SWCNT) had been mixed at a mass ratio of 60:40 was used in the preparation of the second negative electrode mixture slurry. In the negative electrode mixture layer of Comparative Example 3, the content of the MWCNT and the content of the SWCNT in the region R1 were 50% by mass and 50% by mass relative to the entire amount of fibrous carbon in the region R1, respectively. Also, the content of the MWCNT and the content of the SWCNT in the region R2 were 60% by mass and 40% by mass relative to the entire amount of fibrous carbon in the region R2, respectively.

[Cycle Test]

For each of the batteries of Examples and Comparative Examples, constant current charging was carried out under a temperature environment of 25° C. until the battery voltage reached 4.2 V at a constant current of 0.5 It, followed by charging at a constant voltage of 4.2 V until the current value reached 1/50 It. Thereafter, constant current discharging was carried out until the battery voltage reached 2.5 V at a constant current of 0.51 It. This charging and discharging cycle was repeated 500 times.

[Evaluation of Capacity Maintenance Rate After Cycle Test]

For each of the batteries of Examples and Comparative Examples, the discharging capacity at the first cycle of the cycle test described above and the discharging capacity at the 500th cycle were determined, and the capacity maintenance rate was calculated according to the following equation. The results are summarized in Table 1.

Capacity maintenance rate (%)=(discharging capacity at 500th cycle÷discharging capacity at 1st cycle)×100

TABLE 1

| | NEGATIVE ELECTRODE MIXTURE LAYER REGION R1 | | | | NEGATIVE ELECTRODE MIXTURE LAYER REGION R2 | | | | EVALUATION OF BATTERY PERFORMANCE CYCLE CAPACITY MAINTENANCE RATE |
|---|---|---|---|---|---|---|---|---|---|
| | GRAPHITE BET [$m^2/g$] | MWCNT [PERCENTAGE IN FIBROUS CARBON] | SWCNT [PERCENTAGE IN FIBROUS CARBON] | SIO [PERCENTAGE IN NEGATIVE ELECTRODE ACTIVE MATERIAL] | GRAPHITE BET [$m^2/g$] | MWCNT [PERCENTAGE IN FIBROUS CARBON] | SWCNT [PERCENTAGE IN FIBROUS CARBON] | SIO [PERCENTAGE IN NEGATIVE ELECTRODE ACTIVE MATERIAL] | |
| EXAMPLE 1 | 1.5 | 60 wt % | 40 wt % | — | 2.5 | 40 wt % | 60 wt % | — | 94.2% |
| EXAMPLE 2 | 1.5 | 100 wt % | — | — | 2.5 | — | 100 wt % | — | 94.8% |
| EXAMPLE 3 | 1.5 | 75 wt % | 25 wt % | 10 wt % | 2.5 | 25 wt % | 75 wt % | 10 wt % | 94.4% |
| COMPARATIVE EXAMPLE 1 | 1.5 | 40 wt % | 60 wt % | — | 2.5 | 60 wt % | 40 wt % | — | 88.7% |
| COMPARATIVE EXAMPLE 2 | 1.5 | 40 wt % | 60 wt % | — | 2.5 | 50 wt % | 50 wt % | — | 89.2% |
| COMPARATIVE EXAMPLE 3 | 1.5 | 50 wt% | 50 wt % | — | 2.5 | 60 wt % | 40 wt % | — | 88.5% |

As shown in Table 1, all of the batteries of Examples have higher capacity maintenance rates after the cycle test in comparison to the batteries of Comparative Examples, and a decrease in the capacity during the charging and discharging cycle of the battery is suppressed.

REFERENCE SIGNS LIST

10 Nonaqueous electrolyte secondary battery
11 Electrode body
12 Positive electrode terminal
13 Negative electrode terminal
14 Exterior can
15 Sealing plate
16 Gas discharge valve
17 Liquid injection portion
20 Positive electrode
21 Positive electrode core body
23 Core body laminated portion
25 Positive Electrode current collector
30 Negative Electrode
31 Negative electrode core body
32 Negative electrode mixture layer
33 Core body laminated portion
35 Negative electrode current collector
40 Separator

The invention claimed is:

1. A negative electrode for a nonaqueous electrolyte secondary battery, comprising:
a negative electrode core body; and
a negative electrode mixture layer provided on a surface of the negative electrode core body,
wherein the negative electrode mixture layer includes graphite and fibrous carbon including single wall fibrous carbon and multiwalled fibrous carbon, and
wherein, a range of 40% of a thickness of the mixture layer from a surface of the negative electrode mixture layer on a side opposite to the negative electrode core body is defined as a first region and a range of 40% of a thickness of the mixture layer from an interface between the negative electrode mixture layer and the negative electrode core body is defined as a second region,
a BET specific surface area of the graphite included in the first region is smaller than a BET specific surface area of the graphite included in the second region, and
the first region includes the single wall fibrous carbon and the multiwalled fibrous carbon and includes the multiwalled fibrous carbon in greater quantity than the single wall fibrous carbon in terms of mass, and the second region includes the single wall fibrous carbon and the multiwalled fibrous carbon and includes the single wall fibrous carbon in greater quantity than the multiwalled fibrous carbon in terms of mass.

2. The negative electrode for a nonaqueous electrolyte secondary battery according to claim 1, wherein 60% by mass or more of the fibrous carbon included in the first region is the multiwalled fibrous carbon and 60% by mass or more of the fibrous carbon included in the second region is the single wall fibrous carbon.

3. The negative electrode for a nonaqueous electrolyte secondary battery according to claim 1, wherein the BET specific surface area of the graphite included in the first region is 0.5 $m^2/g$ or more and less than 2 $m^2/g$, and the BET specific surface area of the graphite included in the second region is 2 $m^2/g$ or more and 5 $m^2/g$ or less.

4. The negative electrode for a nonaqueous electrolyte secondary battery according to claim 1, wherein the negative electrode mixture layer includes an Si based active material containing Si.

5. A nonaqueous electrolyte secondary battery, comprising:
the negative electrode according to claim 1;
a positive electrode; and
a nonaqueous electrolyte.

* * * * *